United States Patent Office 3,232,969
Patented Feb. 1, 1966

3,232,969
PROCESS OF PRODUCING INORGANIC-ORGANIC MIXED SALTS
Robert H. Sifferd, Pittsfield, N.H., assignor to The Saltec Corporation, Concord, N.H., a corporation of New Hampshire
No Drawing. Filed Mar. 19, 1962, Ser. No. 180,838
The portion of the term of the patent subsequent to June 12, 1979, has been disclaimed
11 Claims. (Cl. 260—401)

This application is a continuation-in-part of my copending application Serial No. 852,924, filed November 16, 1959, now U.S. Patent No. 3,038,899, and entitled "Mixed Inorganic-Organic Salts."

This invention relates to a process of producing inorganic-organic mixed salts, and more particularly to a process of producing mixed salts of polyvalent organic acids containing both inorganic and organic cations.

The mixed salts which can be prepared by the process of this invention may be generally represented by the formula

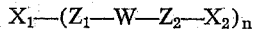

wherein the expression —$Z_1$—W—$Z_2$— represents a polyvalent organic acid radical in which $Z_1$ and $Z_2$ are acid groups, wherein $Z_1$ differs relatively in ionizability from $Z_2$, wherein W represents an organic radical, wherein $X_1$ and $X_2$ are cations of which one of such $X_1$ or $X_2$ is a metal and the other of such $X_1$ and $X_2$ is an organic ammonium group, wherein of $X_1$ and $X_2$ at least $X_1$ is a polyvalent cation, and wherein $n$ is an integer of at least 2, and represents the valences of the polyvalent cation which are satisfied by combination with acid groups of the organic acid to provide a salt.

In a preferred embodiment, mixed salts produced by the process of this invention may be represented by the formulae

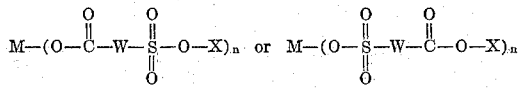

wherein M is a divalent or trivalent metal, wherein W is a hydrocarbon radical, wherein X is an organic ammonium group, and wherein $n$ is one of the integers 2 or 3.

Pursuant to the process of the present invention, the inorganic-organic mixed salts are prepared by reacting a dibasic organic acid or an alkali metal salt thereof with a reagent selected from the class consisting of an organic ammonium base or salt thereof and a polyvalent metal ion. To achieve success in the process, one acid group of the dibasic organic acid should have a substantially greater degree of ionizability than the other acid group therein. The intermediate product thus obtained is then reacted with the other member of the class than the one previously used. For example, if the dibasic organic acid was first reacted with the organic ammonium base to produce the intermediate, then the intermediate would be reacted with the polyvalent metal ion. Conversely, if the dibasic organic acid was first reacted with the polyvalent metal ion, then the intermediate would be reacted with the organic ammonium base. In carrying out the reaction, the reagent should be reacted in the proportions of one mole of the organic ammonium compound per each mole of the dibasic organic acid so that one of the acid groups remains free to react with the polyvalent metal ion. Also, at least two moles each of the diabasic organic acid and the ammonium compound should be reacted with each mole of the polyvalent metal ion.

For example, trimethyloctadecyl ammonium (alpha cupric sulfonate) stearate can be prepared by combining with water equivalent amounts of cupric hydroxide (0.5 mole) and alpha sulfo-stearic acid (1 mole) to obtain the intermediate salt cupric (heptadecyl-1-carboxyl) sulfonate, then combining with the resulting solution of such intermediate salt an equivalent amount of trimethyloctadecyl ammonium hydroxide (1 mole) to produce an aqueous suspension of the mixed inorganic-organic salt, thereafter separating the insoluble mixed salt from the residual aqueous solution, and dehydrating the separated mixed salt to obtain a dry powder form thereof. In preparing the isomeric trimethyloctadecyl ammonium (heptadecyl-1-cupric carboxylate) sulfonate, it will be found that the intermediate salt trimethyloctadecyl ammonium (heptadecyl-1-carboxyl) sulfonate is substantially insoluble in water, and thus such intermediate salt can be more efficiently obtained in an organic solvent such as methylethyl ketone. Consequently, this isomer can be prepared by combining in methylethyl ketone equivalent amounts of trimethyloctadecyl ammonium hydroxide (1 mole) and alpha sulfo-stearic acid (1 mole) to obtain the intermediate salt, then combining with the methylethyl ketone solution of such intermediate salt a minor portion of an aqueous suspension containing an equivalent amount of cupric hydroxide (0.5 mole), whereupon the cupric hydroxide will be seen to diffuse into the methylethyl ketone phase of the resulting solvent mixture to react with the intermediate salt in forming the mixed inorganic-organic salt, thereafter separating the aqueous phase of such mixture from the methylethyl ketone phase thereof, and subjecting the separated methylethyl ketone solution to evaporation in obtaining the mixed salt in dry form.

However, a suspension of the intermediate salt in a suitable inert solvent system may be reacted with the second cation compound to obtain the mixed salt of this invention, providing such mixed salt is less soluble in the solvent system than the intermediate salt. Accordingly, although only a minor portion of the intermediate salt may be in solution form at any given instant, the continuous insolubilization of the mixed salt tends to shift the reaction towards completion. Exceptional results have been obtained when water and methylethyl ketone have been employed as solvents in the formation of these mixed salts, but it will be apparent to those skilled in the art that other readily ascertained solvents may also be utilized in this sequence of reactions.

The preparation of these mixed salts will be governed generally by the phenomenon of electrolytic dissociation. That is, salt formation will be generally favored by an alkaline shift of pH in the reaction mixture, while acidification thereof tends to effect displacement of the metal or the organic ammonium group from the organic acid. Consequently, it is desirable to react the organic acid or the intermediate salt with the metal or the amine or quaternary ammonium compound as a base, and especially desirable results are obtained when the metal or the quaternary ammonium compound is in the hydroxide form. However, there may be utilized metal salts or quaternary ammonium salts, such as chlorides, providing that there is added to the reaction mixture an alkali, such as sodium hydroxide, to neutralize the anion by-products, such as the chloride ions.

The characterization of the acid groups of the organic acid on the basis of their degree of ionizability has reference to the phenomenon of electrolytic dissociation. Generally, the degree to which a molecule ionizes relates to the ratio of ionized to un-ionized molecules obtained in aqueous solution at a given temperature and at a specified concentration thereof. For example, hydrochloric acid demonstrates a greater degree of ionization than does acetic acid.

On the basis of the general principles set out above, it will be seen that there are many possible combinations of acid groups in the dibasic organic acid which can be employed in the process of this invention. However, certain combinations have been found to produce especially good results. These are: (1) a sulfonic acid group with a carboxylic acid group, (2) a sulfonic acid group with a phenolic hydroxy group, (3) a carboxylic acid group with a phenolic hydroxy group, and (4) a carboxylic acid group with an arsonic acid group. The sulfocarboxylic acids are especially desirable.

The polyvalent metal may be derived from any metal salt or metal base. Especially desirable results are obtained with divalent metals. One important subclass of compounds is obtained by carrying out the reaction with either mercuric ions or cupric ions.

The organic ammonium base may be any organic compound including at least one nitrogen-containing group having a basic reaction. Consequently, the organic ammonium base may be derived from any primary, secondary, or tertiary amine, or any quaternary ammonium compound, and including mono and polyamines and mono and polyquaternary ammonium compounds. Especially desirable results are obtained with a quaternary ammonium compound containing a single ammonium radical.

When, in the preparation of these mixed salts, there is employed a dibasic organic acid having the formula $HZ_1-W-Z_2H$, in which $Z_2$ demonstrates a greater degree of ionizability than does $Z_1$, the preparation of the intermediate salt may involve the following alternative reactions (1)

(2)
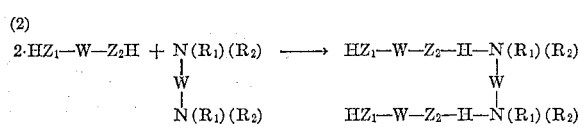

(3)
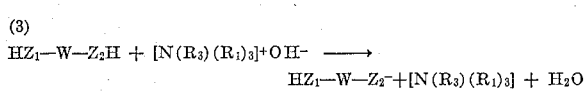

(4)
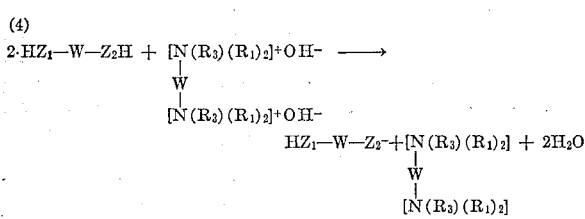

(5)
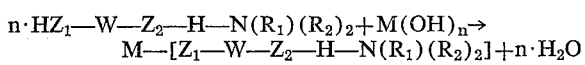

The intermediate salt obtained in the foregoing reactions 1 or 3, upon reaction with a polyvalent metal base, will yield the corresponding mixed salt. For example, the reaction of the intermediate salt from 1 above will proceed as follows:

$$n \cdot HZ_1-W-Z_2-H-N(R_1)(R_2)_2 + M(OH)_n \rightarrow$$
$$M-[Z_1-W-Z_2-H-N(R_1)(R_2)_2] + n \cdot H_2O$$

The treatment of the intermediate salt obtained in the foregoing reaction 5 with a mono or diamine or a mono or diquaternary ammonium compound will result in mixed salts differing from those illustrated above only in that the metal will be combined with acid group $Z_2$ of the organic acid instead of acid group $Z_1$ thereof, as shown in the reactions illustrated above.

In the foregoing formulas, $Z_1$ and $Z_2$ are acid groups wherein $Z_1$ differs relatively in ionizability from $Z_2$; W is a hydrocarbon radical, which preferably contains from 1 to 22 carbon atoms; $R_1$ is a hydrocarbon radical, preferably containing from 1 to 22 carbon atoms, and including carbon atoms adjacent to a nitrogen atom in a heterocyclic radical; $R_2$ is hydrogen or a hydrocarbon radical, preferably containing from 1 to 22 carbon atoms; $R_3$ is a hydrocarbon group, preferably containing from 1 to 22 carbon atoms; M is a divalent or trivalent metal; and $n$ is an integer of at least 2, and corresponding with valances of the polyvalent metal.

In one preferred embodiment of the process of the present invention, an alkali metal salt of the dibasic organic acid is first reacted with an organic ammonium salt to produce the intermediate product. The intermediate is then reacted with the metal ion to produce the inorganic-organic mixed salt.

The compounds produced by the process of the present invention have many unusual properties which adapt them for special uses. It has been found that mixed inorganic-organic salts produced by the process of this invention can be used in the recovery and concentration of polyvalent inorganic cations, especially rare and radioactive polyvalent metals. Many of the mixed inorganic-organic salts, especially those containing mercury or copper, are active against various bacteria, fungi, and protozoa.

The invention is further illustrated by the following specific examples:

*Example I*

Trimethyloctadecyl ammonium (alpha calcium sulfonate) stearate can be prepared by the following method:

Alpha sulfo stearic acid, in the amount of 36.4 gms., is combined with 750 ml. of water to obtain a 5% aqueous solution thereof. To this aqueous solution is added calcium hydroxide, in the amount of 3.7 gms., to obtain, as the intermediate salt, calcium (heptadecyl-1-carboxyl) sulfonate.

Then, to the foregoing aqueous solution of the intermediate salt is added 32.9 gms. of trimethyloctadecyl ammonium hydroxide to obtain the corresponding mixed inorganic-organic salt. The resulting precipitate of such mixed salt is separated from the supernatant liquid by centrifugation. This separated precipitate is then subjected to evaportion to obtain the mixed salt in dry powder form.

*Example II*

Trimethyl ammonium (alpha cupric sulfonate) palmitate can be prepared by the following method:

Alpha sulfo palmitic acid, in the amount of 33.6 gms., is combined with 750 ml. of methylethyl ketone to obtain an approximately 5% organic solvent solution thereof. To this organic solvent solution is added 5.9 gms. of trimethyl amine to obtain, as the intermediate salt, trimethyl ammonium (pentadecyl-1-carboxyl) sulfonate.

To the foregoing solvent solution of the intermediate salt is added 75 cc. of an aqueous suspension containing 4.9 gms. of cupric hydroxide.

The conversion of the aqueous phase of the resulting solvent mixture from a suspension to a solution will indicate completion of the reaction to form the mixed inorganic-organic salt. Thereupon, the aqueous phase of such solvent mixture can be separated from the organic solvent phase thereof by decantation. Then, the separated methylethyl ketone solution can be evaporated to dryness by distillation to obtain the mixed salt in dry powder form.

*Example III*

The effectiveness of the mixed inorganic-organic salts of this invention in inhibiting the growth of micro-organisms was determined by the following method:

The following mixed salts were subjected to analysis, and the number preceding each of such mixed salts will be employed in reference thereto in the test results hereinafter:

(1) Trimethyloctadecyl ammonium (alpha cupric sulfonate) stearate (2) Trimethyloctadecyl ammonium (heptadecyl-1-cupric carboxylate) sulfonate.
(3) Piperazinium (alpha cupric sulfonate) stearate
(4) Trimethyloctadecyl ammonium (heptadecyl-1-carboxyl) sulfonate
(5) Trimethyloctadecyl ammonium (alpha cadmium sulfonate) stearate
(6) Trimethyloctadecyl ammonium (alpha calcium sulfonate) stearate
(7) Trimethyloctadecyl ammonium (alpha cobaltous sulfonate) stearate
(8) Trimethyloctadecyl ammonium (hepta decyl-1-mercuric carboxylate) sulfonate.

The following microorganisms were employed in the analysis, and the letter preceding each of such micro-organisms will be employed in reference thereto in the test results hereinafter:

A. *Saccharomyces cerevisiae*
    B. *Saccharomyces fragilis*
    C. *Penicillium glaucum*
    D. *Aspergillus fonsecaens*
    E. *Escherichia coli*
    F. *Micrococcus albus*

The nutrient medium employed in this analysis is referred to as Bacto-Penassay dextrose agar in the ninth edition of the Difco Manual, pages 204–205, and had the following composition:

| | | |
|---|---|---|
| Beef extract | gms | 1.5 |
| Yeast extract | gms | 3.0 |
| Peptone | gms | 6.0 |
| Agar | gms | 15.0 |
| Dextrose | gms | 30.0 |
| Distilled water | liter | 1 |

In the test procedure, the nutrient medium was poured into 12 petri plates and allowed to solidify therein. An inoculum of 0.5 ml. of each of the test microorganims was introduced into the petri plates, two plates per microorganism, and the inoculum was spread evenly with a glass rod over the surface of the nutrient medium therein. Thereafter, a few crystals of each of the foregoing mixed salts were introduced on the surface of the nutrient medium in the inoculated petri plates at least 1½ inches apart, four of the mixed salts per petri plate. Thus, the two petri plates of such microorganism contained the spectrum of eight mixed salts.

The petri plates, containing the microorganisms and the mixed salts, were incubated, and the growth of the microorganisms in each of such plates was determined at intervals of 24, 48 and 72 hours. The yeasts and molds were incubated at a temperature of 30 degrees centigrade, while the bacteria were incubated at a temperature of 37 degrees centigrade.

The results of this analysis are set forth in the following tables in which growth of the microorganisms is indicated by a plus (+) sign, in which inhibition of the microorganisms is expressed by a minus (−) sign, and in which indetermined growth or inhibition of the microorganisms is expressed by a plus/minus (±) sign:

| Mixed salt | 24 hours | | | | | |
|---|---|---|---|---|---|---|
| | E | F | A | B | C | D |
| 1 | ± | − | + | + | + | + |
| 2 | + | + | + | + | + | + |
| 3 | + | + | + | + | + | + |
| 4 | ± | ± | + | ± | + | + |
| 5 | ± | − | ± | − | + | + |
| 6 | + | + | + | + | + | + |
| 7 | + | + | + | + | + | ± |
| 8 | − | − | − | − | − | ± |

| Mixed salt | 48 hours | | | | | |
|---|---|---|---|---|---|---|
| | E | F | A | B | C | D |
| 1 | + | ± | + | + | + | +* |
| 2 | + | ± | + | + | + | + |
| 3 | + | ± | + | + | + | + |
| 4 | + | ± | + | + | + | + |
| 5 | − | ± | − | ± | ± | *1 |
| 6 | + | + | ± | − | + | + |
| 7 | + | + | + | ± | + | + |
| 8 | − | − | − | − | − | + |

| Mixed salt | 72 hours | | | | | |
|---|---|---|---|---|---|---|
| | E | F | A | B | C | D |
| 1 | + | − | + | + | + | + |
| 2 | + | + | + | + | + | + |
| 3 | + | ± | + | + | + | + |
| 4 | + | ± | + | + | + | + |
| 5 | ± | − | ± | ± | *1 | *2 |
| 6 | + | + | ± | − | + | + |
| 7 | + | + | + | ± | + | + |
| 8 | − | − | − | − | − | + |

*1 No sporulation.
*2 Spores beginning to appear at the outer edge of the growth zone.

Compound No. 4 is a control in which the polyvalent inorganic cation component was omitted. These results demonstrate that the mixed salts of this invention are selectively inhibitory of the growth of microorganisms.

*Example IV*

To a solution of 14 gms. of sulfoacetic acid in 100 ml. of water is added 9.3 gms. of aniline. To the resulting preparation is added an aqueous suspension of 4.65 gms. of cobaltous hydroxide. The reaction is completed after several minutes with stirring. The product, cobaltous (alpha aniline sulfonate) acetate, is separated from the supernatant liquid, by filtration, washed with water, and dried.

*Example V*

To a solution of 22.4 gms. of alpha sulfo-octanoic acid in 200 ml. of decyl alcohol is added 39.9 gms. of didodecyl dimethyl ammonium hydroxide. The resulting solution is stirred with 100 ml. of an aqueous solution of 7.9 gms. of copper sulfate, and the emulsion so produced is adjusted to pH 6.5 by the slow addition of aqueous sodium hydroxide. Agitation is stopped, the layers are allowed to separate, and the now colorless aqueous layer is drawn off and discarded. The solvent phase is a solution of the mixed salt, cupric (alpha didodecyl dimethyl ammonium sulfonate) octanoate, a clear blue solution.

*Example VI*

A solution of 17.4 gms. of 1-phenol-4-sulfonic acid in 200 ml. of water is mixed with 7.9 gms. of pyridine, and to the resulting solution is added 3.7 gms. of calcium hydroxide. The resulting mixed salt is 1-calcium (4-pyridine sulfonate) carbolate.

*Example VII*

A solution of 13.8 gms. of salicylic acid in 50 ml. of 75% aqueous ethanol is mixed with 7.3 gms. of diethyl amine, and the resulting solution is stirred with 2.9 gms. of magnesium hydroxide. The mixed salt thus produced is diethyl ammonium (magnesium phenol) carboxylate.

*Example VIII*

An aqueous solution of 1 mole of beta sulfopropionic acid is mixed with 1 mole of n-butylamine, and the resulting preparation is stirred with ⅓ mole of ferric hydroxide to obtain the mixed salt, ferric (beta n-butyl ammonium sulfonate) propionate.

Example IX

An aqueous solution of 1 mole of alpha sulfo butyric acid is mixed with 1 mole of piperidine, and the resulting preparation is stirred with ⅓ mole of aluminum hydroxide to obtain the mixed salt, aluminum (alpha piperidine sulfonate) butyrate.

While in the foregoing specification various embodiments of this invention have been set forth in considerable detail for the purpose of illustration, it will be apparent to those skilled in the art that this invention is susceptible to other embodiments and that many of these details can be varied widely without departing from the basic concept and spirit of the invention.

I claim:

1. The process of producing inorganic-organic mixed salts, comprising reacting a dibasic organic acid compound selected from the class consisting of dibasic, organic acids and the alkali metal salts thereof with a reagent selected from the group consisting of (1) a monobasic organic ammonium compound and salts thereof and (2) a polyvalent metal ion selected from the group consisting of divalent and trivalent metal ions, said organic acids having the formula $HZ_1—W—Z_2H$ wherein W is hydrocarbon containing from 1 to 22 carbons and $Z_1$ and $Z_2$ are acid groups which are selected in combination from the groups consisting of (a) sulfonic acid with carboxylic acid, (b) sulfonic acid with phenolic hydroxy, (c) carboxylic acid with phenolic hydroxy, and (d) carboxylic with arsonic acid, whereby one acid group has a greater degree of ionizability than the other acid group, and thereafter reacting the intermediate product thus obtained with the other member of said group than the one previously used, thereby obtaining said mixed salt, said reagents being reacted in the proportions of one mole of said organic ammonium compound per each mole of said dibasic organic acid compound so that one of said acid groups remains free to react with said polyvalent metal ion, and two moles of each of said dibasic organic acid compound and said organic ammonium compound reacting with each mole of said metal ion when said metal ion is divalent and three moles of each of said compounds with each mole of said metal ion when said metal ion is trivalent.

2. The process of claim 1 in which said dibasic organic acid is a sulfocarboxylic acid.

3. The process of claim 1 wherein said organic ammonium compound is a quaternary ammonium compound containing a single ammonium group.

4. The process of claim 1 wherein said polyvalent metal ion is a divalent metal ion.

5. The process of claim 1 wherein said divalent metal ion is mercuric.

6. The process of claim 1 in which said dibasic organic acid compound is first reacted with said organic ammonium compound, and the intermediate product thus obtained is thereafter reacted with said polyvalent metal ion.

7. The process of claim 1 wherein the reaction between the intermediate product and the polyvalent metal is carried out in the presence of sufficient hydroxyl ions to react with the liberated hydrogen ions as the polyvalent metal reacts with the intermediate product.

8. The process of claim 7 in which said dibasic organic acid compound contains a sulfonic acid group with a carboxylic acid group.

9. The process of producing inorganic-organic mixed salts, comprising reacting a disbasic organic acid selected from the group consisting of dibasic organic acids and the alkali metal salts thereof with a reagent selected from the group consisting of (1) a quaternary ammonium compound containing a single ammonium group and (2) a divalent metal ion, said organic acids having the formula $HZ_1—W—Z_2H$ wherein W is hydrocarbon containing from 1 to 22 carbons and $Z_1$ and $Z_2$ are acid groups which are selected in combination from the groups consisting of (a) sulfonic acid with carboxylic acid, (b) sulfonic acid with phenolic hydroxy, (c) carboxylic acid with phenolic hydroxy, and (d) carboxylic with arsonic acid, and thereafter reacting the intermediate product thus obtained with the other member of said group than the one previously used, thereby obtaining said mixed salt, said reagents being reacted in proportions of one mole of said quaternary ammonium compound per each mole of said dibasic organic acid compound so that one of said acid groups remains free to react with said divalent metal ion, and two moles of each of said dibasic organic acid compound and said quaternary ammonium compound reacting with each mole of said divalent metal ion.

10. The process of claim 9 in which said divalent metal ion is selected from the group consisting of cupric, mercuric, calcium, cadmium, cobaltous, and magnesium.

11. The process of producing inorganic-organic mixed salts, comprising reacting a dibasic organic acid compound selected from the class consisting of dibasic organic acids and the alkali metal salts thereof with a reagent selected from the group consisting of (1) a quaternary ammonium compound containing a single ammonium group and (2) a divalent metal ion, said organic acids having the formula $HZ_1—W—Z_2H$ wherein W is hydrocarbon containing from 1 to 22 carbons and $Z_1$ is a sulfonic acid group and $Z_2$ is a carboxylic acid group, said divalent metal ion being selected from the group consisting of cupric, mercuric, calcium, cadmium, cobaltous, and magnesium, and thereafter reacting the intermediate product thus obtained with the other member of said group than the one previously used, thereby obtaining said mixed salt, said reagents being reacted in proportions of one mole of said quaternary ammonium compound per each mole of said dibasic organic acid compound so that one of said acid groups remains free to react with said divalent metal ion, and two moles of each of said dibasic organic acid compound and said quaternary ammonium compound reacting with each mole of said divalent metal ion.

No references cited.

CHARLES B. PARKER, *Primary Examiner.*

DANIEL D. HORWITZ, *Examiner.*